US007095725B2

United States Patent
Lott et al.

(10) Patent No.: US 7,095,725 B2
(45) Date of Patent: Aug. 22, 2006

(54) METHOD AND APPARATUS FOR DATA TRANSMISSION ON A REVERSE LINK IN A COMMUNICATION SYSTEM

(75) Inventors: Christopher Gerard Lott, San Diego, CA (US); Jean Put Ling Au, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 425 days.

(21) Appl. No.: 10/324,241

(22) Filed: Dec. 19, 2002

(65) Prior Publication Data

US 2004/0120287 A1 Jun. 24, 2004

(51) Int. Cl.
*H04Q 7/00* (2006.01)

(52) U.S. Cl. .......................... 370/332; 370/333
(58) Field of Classification Search ................ 370/329, 370/331, 332, 333, 334, 335, 342, 441, 465
See application file for complete search history.

(56) References Cited

U.S. PATENT DOCUMENTS 5,923,650 A * 7/1999 Chen et al. ................. 370/331
2002/0141349 A1 * 10/2002 Kim et al. .................. 370/252

FOREIGN PATENT DOCUMENTS

EP 0 969 623 1/2000
WO 00/64373 11/2000

OTHER PUBLICATIONS

W.Y. Yeo et al.., "Enhanced Rate Control Scheme for 1xEV–DO Reverse Traffic Channel," Electronics Letters, vol. 39, No. 23, Nov. 13, 2003, 1 page (double-sided).
"cdma2000 High Rate Packet Data Air Interface Specification," 3GPP2, Sep. 12, 2000, Title page and Table of Contents and pp. 1–54.

* cited by examiner

*Primary Examiner*—Phirin Sam
(74) *Attorney, Agent, or Firm*—Philip Wadsworth; Sandra L. Godsey; S. Hossain Beladi

(57) ABSTRACT

Systems and methods for decreasing delays and thereby improving the performance of data transmissions in wireless communication systems by enabling increased data transmission rates to be selected for a reverse link between an access terminal and an access network. The new data rate is selected from several limiting rates, including a data-justified rate and a ramp-up-limited rate. In one embodiment, the data-justified rate is constrained to decrease in a controlled manner and cannot suddenly drop to 0. In another embodiment, the ramp-up-limited rate is allowed to return quickly to a sticky rate if the system is not busy rather than having to ramp up to the sticky rate according to the standard probabilities.

32 Claims, 8 Drawing Sheets

METHOD AND APPARATUS FOR DATA TRANSMISSION ON A REVERSE LINK IN A COMMUNICATION SYSTEM

BACKGROUND OF THE INVENTION

The invention relates generally to the field of telecommunications, and more particularly to systems and methods for improving the performance of data transmissions in wireless telecommunications systems.

In a typical wireless voice/data communications system, a base station is associated with an area of coverage. This area is referred to as a sector. Mobile stations which are within the sector can transmit data to the base station and receive data from the base station. In the context of data communications in particular, base stations may be referred to as access networks, and mobile stations may be referred to as access terminals. Access terminals can communicate simultaneously with more than one access network and, as an access terminal moves, the set of access networks with which it communicates may change.

The parameters for communications between a particular access network and a particular access terminal are based in part upon their relative positions and the quality and strength of the signals that are respectively transmitted and received by them. For example, as the access terminal moves farther away from the access network, the strength of the signal received from the access network by the access terminal will decrease. Accordingly, the error rate of the received data will increase. The access network will therefore typically compensate for the increased distance by reducing the rate at which it transmits data to the access terminal. This allows the access terminal to receive and decode the access network's signal with fewer errors. When the access terminal moves closer to the access network, the signal strength increases, so a higher data rate can be used to transmit data to the access terminal.

Similarly, as the access terminal moves farther away from the access network, the strength of the signal received from the access terminal by the access network will decrease, thereby potentially resulting in a higher error rate. Like the access network, the access terminal will typically also compensate for the increased distance by decreasing its data rate to allow the access network to receive the signal with fewer errors. The access terminal may also increase its power output to reduce the error rate if requested by the access network. Again, when the access terminal moves closer to the access network, the stronger signal will support a higher data rate.

In one system, the access terminal is responsible for determining the rate at which data will be transmitted from the access terminal to the access network. This rate is determined based upon a number of factors. The primary factors are the absolute maximum rate at which the access terminal and access network can communicate, the maximum rate based upon the allowable power output of the access terminal, the maximum rate justified by the amount of data which the access terminal has in queue, and the maximum rate allowable based upon ramp-up constraints. In this system, each of these rates presents a hard limit that cannot be exceeded by the selected data rate. In other words, the selected data rate is no higher than the minimum of these four rates.

The first two of these rates (the absolute and power-limited maximum rates) result from physical constraints of the system and are outside the control of the access terminal. The third and fourth rates (the data-justified and ramp-up-limited rates) are variable and are dynamically determined based upon the specific prevailing conditions at the access terminal.

The data-justified rate is essentially the maximum rate that can be justified by the amount of data that is queued for transmission by the access terminal. For example, if the access terminal has 1000 bits in its transmit queue, then a data rate of 38.4 kbps (1024 bits/frame) is justified, but a rate of 76.8 (2048 bits/frame) is not justified. If there is no data in the access terminal's transmission queue, then no transmission rate at all is justified.

The ramp-up-limited rate is the maximum rate that is allowed, considering the fact that a rapid ramp-up will suddenly increase the interference perceived by other access terminals and will degrade their performance. If the ramp-up of each access terminal is limited, then the level of interference which it causes will change more slowly and the other access terminals can more easily adjust their operating data rates and transmit powers to adapt to the increased interference. It should be noted that the ramp-up-limited rate is also computed to control the ramp-down of data rates. The overall effect is to minimize wide and/or rapid fluctuations in data rates and to thereby stabilize the overall operation of the access network and access terminals in the system.

While the change in the ramp-up-limited rate is controlled (in regard to both increasing and decreasing data rates), the data-justified rate is not. If the access terminal suddenly has enough data to justify a very high rate, the data-justified rate will suddenly increase. If the access terminal runs out of data, the data-justified rate will suddenly drop to zero. Sudden increases in the data-justified rate typically are not problematic because the ramp-up-limited rate is controlled. Since the minimum of the four rates noted above sets a maximum for the selected data rate, the ramp-up-limited rate will control in this situation. Sudden decreases in the data-justified rate will, however, cause the actual data rate to drop since the data-justified rate is lower than the other rates and will therefore control (keeping in mind that the data rate selected for transmission of data over the next frame is the minimum of the four rates).

In prior art systems, if an access terminal has no data to transmit, no data is transmitted. This is certainly intuitive, and conventional wisdom dictates that useful bandwidth should not be wasted by transmitting useless data. One of the problems that results from allowing the data rate to drop precipitously (to zero, for example) is that it takes some amount of time for the data rate to ramp back up, as explained above. Delays in the transmission of some data may result from the drop and subsequent ramping up of the data rate. This delay is particularly likely in the case of data that is bursty or has discrete arrival processes. One such type of data is real-time video which may comprise 500–1000 byte packets that arrive at the transmit queue at discrete intervals of 60–70 milliseconds. Real-time video is also a notable example of the types of data for which transmission delays are particularly noticeable and therefore unacceptable.

It should also be noted that, while the ramp-up-limited rate is designed to prevent an access terminal from increasing its data rate in a manner that produces too much interference for other access terminals, there are instances in which the additional interference is not too disruptive. If there are few access terminals active in the sector, it may be acceptable for a particular access terminal to increase its data rate more rapidly than allowed by the ramp-up-limited rate.

In such situations, the limit imposed by the ramp-up-limited rate may reduce the overall performance of the system.

SUMMARY OF THE INVENTION

One or more of the problems outlined above may be solved by the various embodiments of the invention. Broadly speaking, the invention comprises systems and methods for improving the performance of data transmissions in wireless telecommunications systems by computing a reverse link data transmission rate which reduces delays in the transmission of bursty data.

One embodiment of the invention comprises a method for improving performance in data transmissions on a reverse link from an access terminal to an access network, wherein the method comprises computing a first data transmission rate, transmitting data on the reverse link at the first data transmission rate, computing a second data transmission rate which is constrained to decrease by a limited amount from the first data transmission rate, and transmitting data on the reverse link at the first data transmission rate. In one embodiment, the second data transmission rate is chosen as the minimum of an absolute maximum rate, a power-limited rate, a data-justified rate and a closed-loop resource allocation rate. Since the first two of these rates are static and the fourth is already constrained to decrease in a controlled manner, the decrease in the second data transmission rate is constrained by controlling decreases in the data-justified rate. This is accomplished in one embodiment by maintaining a dummy rate which is allowed to decay in a predetermined manner. The conventionally calculated data-justified rate is compared to the dummy rate and is not allowed to fall below the dummy rate.

One embodiment of the invention comprises a wireless communication system in which an access terminal is configured to determine a rate at which it will transmit data over a reverse link to an access network. The access terminal includes a transmit subsystem for transmitting the data and a processor which is coupled to the transmit subsystem and configured to provide control information thereto. In particular, the processor is configured to determine a data rate at which the transmit subsystem will send data over the reverse link. In one embodiment, the processor is configured to compute a data-justified rate and a closed-loop resource allocation rate. The processor then chooses the minimum of the data-justified rate, the closed-loop resource allocation rate, an absolute maximum rate and a power-limited rate as the data transmission rate for the next transmission frame. The processor controls decreases in the data-justified rate in order to prevent sudden drops in the data rate from one frame to the next. This is accomplished in one embodiment by maintaining a dummy rate which is caused to decay in a predetermined manner. The data-justified rate is calculated by conventionally computing the data-justified rate, comparing the conventionally computed rate to the dummy rate and then setting the data-justified rate to the greater of the conventionally computed rate and the dummy rate. When the dummy rate is greater than the data-justified rate, transmission of dummy data may be necessary to maintain the desired transmission rate.

One embodiment of the invention comprises a method for improving performance in data transmissions on a reverse link from an access terminal to an access network, wherein the method comprises computing a first data transmission rate, transmitting data on the reverse link at the first data transmission rate, computing a second data transmission rate, and transmitting data on the reverse link at the second data transmission rate, wherein when the wireless communication system is in a not-busy state, computing the second data transmission rate comprises selecting a second rate of a plurality of limiting rates, including a ramp-up-limited rate, wherein the ramp-up-limited rate is allowed to more quickly rise, up to a "sticky" rate. In one embodiment, the sticky rate comprises a maximum rate at which the access terminal has transmitted data since the access terminal last transmitted data during a busy state of the communication system. This sticky rate is increased when the access terminal transmits data in a not-busy state at a rate greater than the sticky rate and is reset when the access terminal transmits data during a busy state of the wireless communication system.

One embodiment of the invention comprises a wireless communication system in which an access terminal is configured to determine a rate at which it will transmit data over a reverse link to an access network. The access terminal includes a transmit subsystem for transmitting the data and a processor which is coupled to the transmit subsystem and configured to provide control information thereto. In particular, the processor is configured to compute a first data transmission rate, transmit data on the reverse link at the first data transmission rate, compute a second data transmission rate, and transmit data on the reverse link at the second data transmission rate, wherein when the wireless communication system is in a not-busy state, the processor is configured to compute the second data transmission rate by selecting a second rate of a plurality of limiting rates, including a ramp-up-limited rate, wherein the ramp-up-limited rate is allowed to increase more rapidly to the sticky rate. In one embodiment, the sticky rate comprises the maximum rate at which the access terminal has transmitted data since the access terminal last transmitted data during a busy state of the communication system. The sticky rate is increased when the access terminal transmits data in a not-busy state at a rate greater than the sticky rate and is reset to the current rate when the access terminal transmits data during a busy state.

Another embodiment of the invention comprises a software application. The software application is embodied in a medium readable by a computer or other data processor employed in an access terminal. The medium may comprise a floppy disk, hard disk drive, CD-ROM, DVD-ROM, RAM, ROM, or the like. The medium contains instructions which are configured to cause the computer or data processor to execute a method which is generally as described above. It should be noted that the computer readable medium may comprise a RAM or other memory which forms part of an access terminal. The access terminal's processor would thereby be enabled to perform a method in accordance with the present disclosure.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
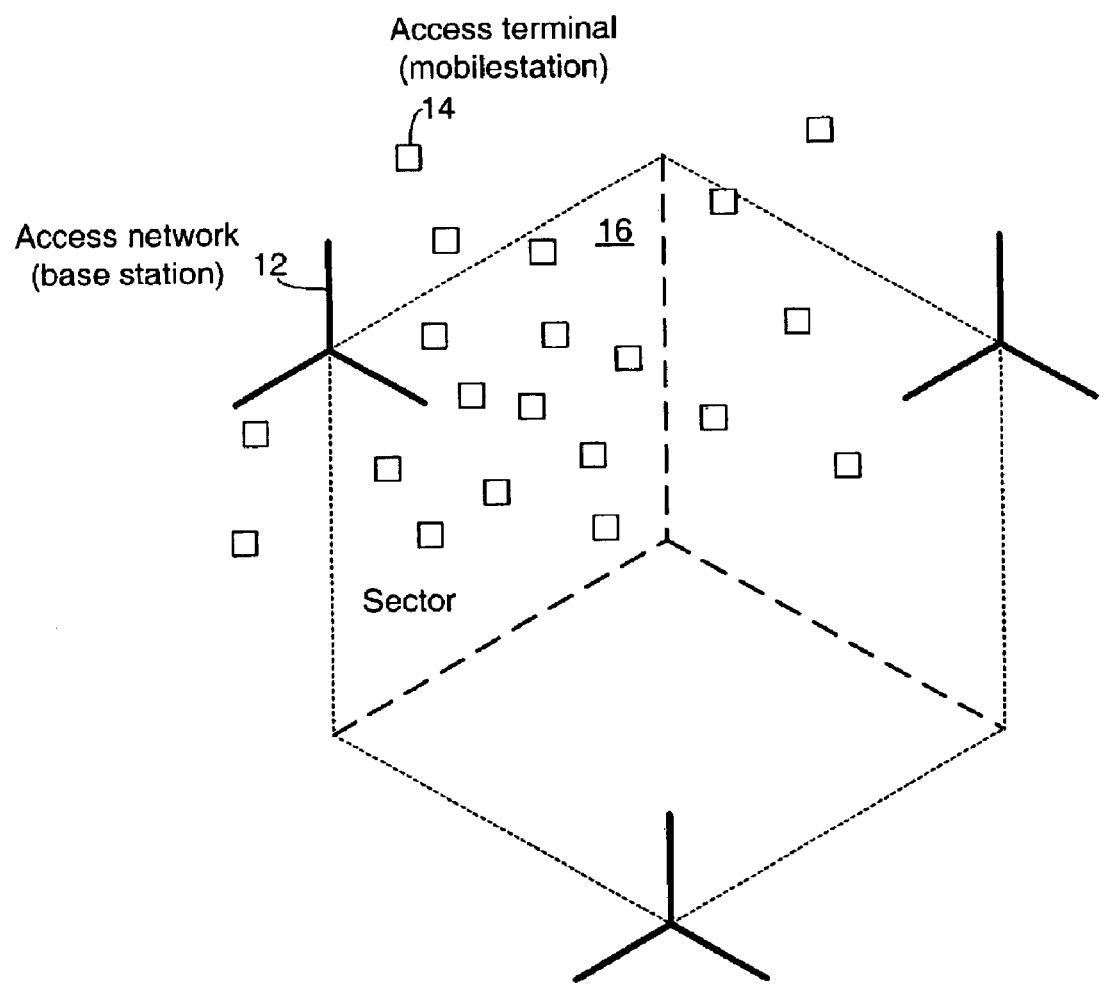
FIG. 1 is a diagram illustrating a portion of a wireless communication system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for improving the performance of data transmissions in wireless telecommunications systems by controlling decreases in the data transmission rate for a reverse link.

Referring to FIG. 1, a diagram illustrating a portion of a wireless communication system in accordance with one embodiment is shown. In this embodiment, the system comprises a plurality of access networks 12 and a plurality of access terminals 14. Each access network 12 communicates with access terminals 14 in the surrounding area. Access terminals may move within the sector, or they may move from a sector associated with one access network to a different sector associated with another access network. The area of coverage is a sector 16. Although the sectors may in actuality be somewhat irregular, and may overlap with other sectors, they are depicted in the figure as being generally delineated by the dotted and dashed lines. It should be noted that, for the sake of clarity, only one of each of the access networks, access terminals and sectors is identified by reference numbers.

Figure 2:
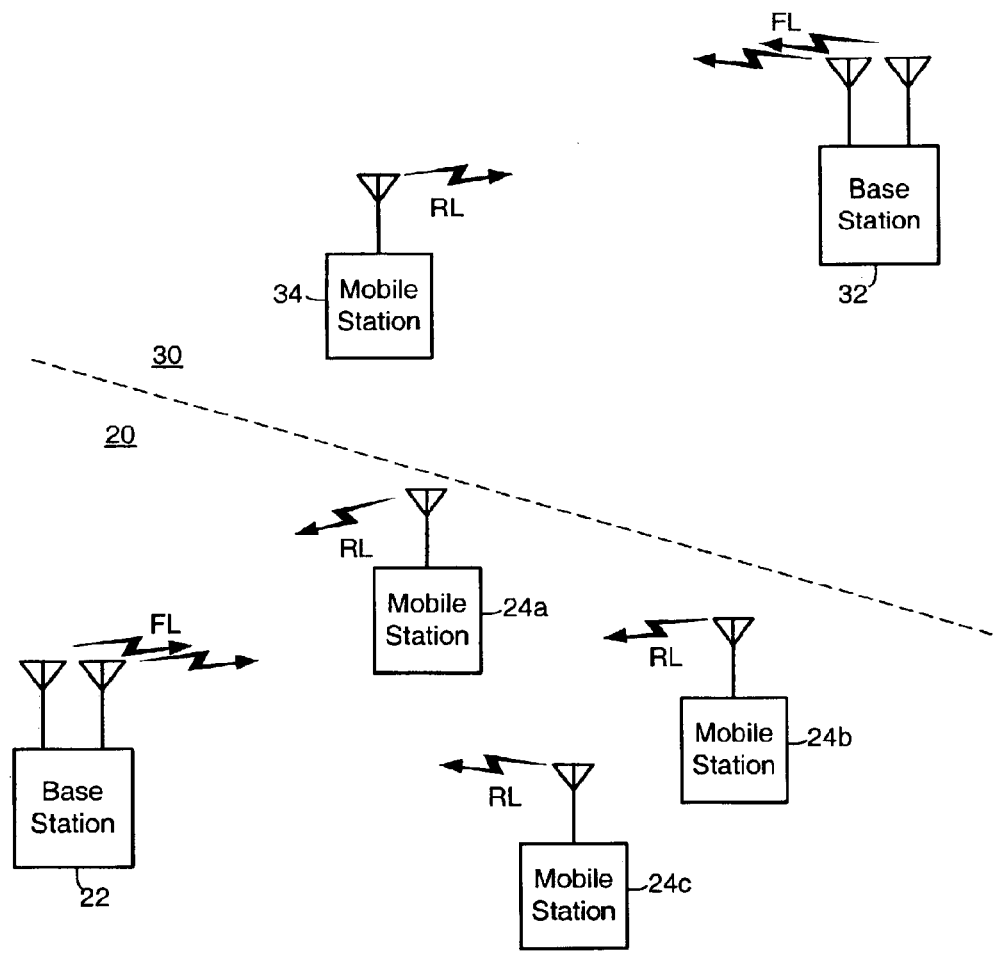
FIG. 2 is a more detailed diagram illustrating the access networks and access terminals in two adjoining sectors of a wireless communication system in one embodiment.

Referring to FIG. 2, a more detailed diagram illustrating the access networks and access terminals in two adjoining sectors of a wireless communication system in one embodiment is shown. In this system, sector 20 includes an access network, (base station) 22 and several access terminals 24a-24c. Sector 30 includes an access network 32 and a single access terminal 34. Access networks 22 and 32 transmit data to the access terminals 24 and 34 via what is referred to herein as a forward link (FL). Access terminals 24 and 34 transmit data back to access networks 22 and 32 via what is referred to as a reverse link (RL).

Figure 3:
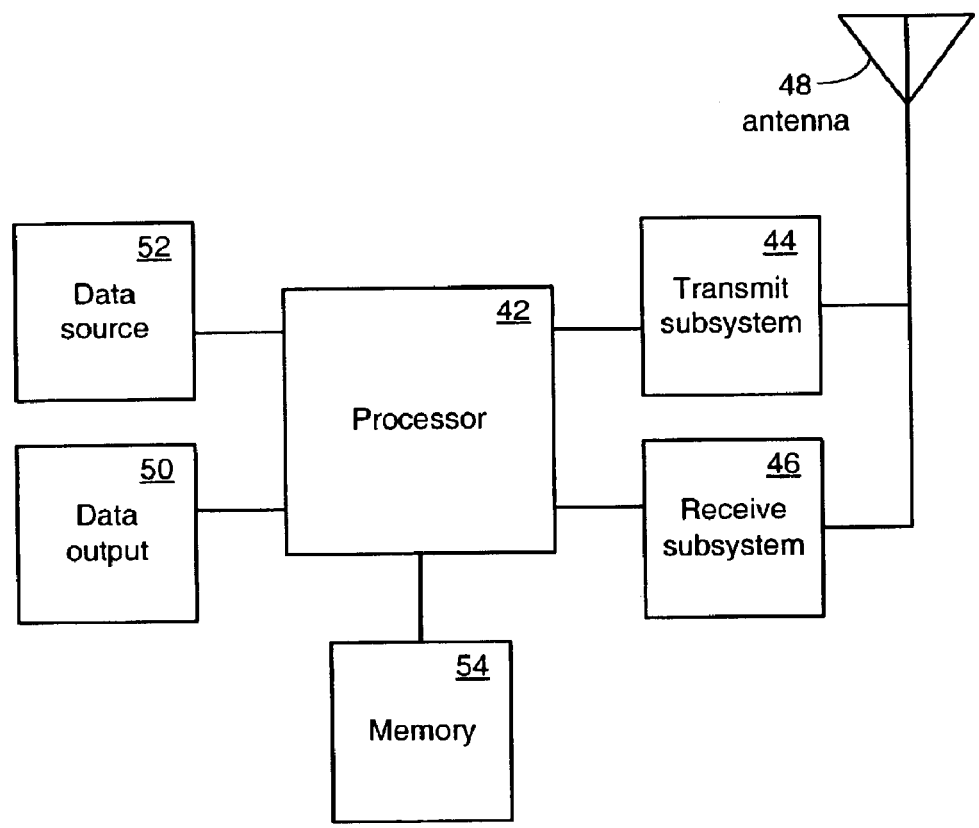
FIG. 3 is a functional block diagram illustrating the structure of an access terminal in one embodiment.

Referring to FIG. 3, a functional block diagram illustrating the structure of an access terminal in one embodiment is shown. In this embodiment, the access terminal comprises a processor 42 coupled to a transmit subsystem 44 and a receive subsystem 46. Transmit subsystem 44 and receive subsystem 46 are coupled to shared antenna 48. Processor 42 receives data from receive subsystem 46, processes the data, and outputs the processed data via output device 50. Processor 42 also receives data from data source 52 and processes the data for transmission. The processed data is then forwarded to transmit subsystem 44 for transmission over the reverse link. In addition to processing the data from receive subsystem 46 and data source 52, processor 42 is configured to control the various subsystems of the access terminal. In particular, processor 42 controls transmit subsystem 44. The access terminal-based functionality described below is implemented in processor 42. Memory 54 is coupled to processor 42 for storage of data used by the processor.

In one embodiment, the system is a cdma2000 1xEV-DO system. The primary characteristics of this system are defined by the IS-856 data communication standard. This standard is based on the IS-95 family of code division multiple access (CDMA) standards. The name "1xEV-DO" refers to the relation to the CDMA2000 family ("1x") and the evolution of the standard ("EV") for data optimized ("DO") operation. The 1xEV-DO system is mainly optimized for wireless Internet access for which a high data throughput on the Forward Link is desirable.

A 1xEV-DO system is designed to communicate data on the forward link at one of the 12 different predetermined data rates ranging from 38.4 kbps to 2.4 Mbps (in addition to the null rate). Corresponding data packet structures are defined (specifying such payments as packet duration, modulation type, etc.) for each of these predetermined data rates. Communications on the reverse link take place at one of five different data rates ranging from 9.6 kbps to 153.6 kbps (plus the null rate). Again, data packet structures are defined for each of these data rates.

The present invention relates primarily to the reverse link. Accordingly, the data rates for the reverse link are set forth below.

| Rate | data rate | |
|---|---|---|
| Index | Kbps | bits/frame |
| 0 | 0 | 0 |
| 1 | 9.6 | 256 |
| 2 | 19.2 | 512 |
| 3 | 38.4 | 1024 |
| 4 | 76.8 | 2048 |
| 5 | 153.6 | 4096 |

For the sake of simplicity in the following discussion, the reverse link data rates will be referred to in terms of the rate index, rather than the number of bits per second or frame.

As indicated above, the present 1xEV-DO-based system is built on CDMA standards. Data that is transmitted over the reverse link is consequently code division multiplexed. That is, the data corresponding to each access terminal is identified by a corresponding code. Each code defines a communication channel. Thus, data from any or all of the access terminals can be transmitted at the same time, and the access network can distinguish the different sources of the data using the codes.

CDM transmissions are interference limited. In other words, the amount of data that can be transmitted is limited by the amount of interference that is present in the environment. While there is a certain amount of interference caused by background or thermal noise, the primary sources of interference with an access terminal's transmissions are the other access terminals in the area. If there are few other access terminals and they are transmitting little data, there will be little interference, so it may be possible to transmit data at a high data rate. On the other hand, if there are many other access terminals that are transmitting large aggregate amounts of data, the level of interference will be higher, and it may only be possible to use a very low data rate for reverse link transmissions.

A mechanism must therefore be provided for determining appropriate data rates for each of the access terminals. Typical CDMA wireless communication systems use a single data rate for all of the access terminals. Control of the data rate is centralized in the access network. This type of rate control has several disadvantages, however. For example, since all of the access terminals use the same data rate, the performance of each individual access terminal cannot be optimized. While some may operate at an optimal rate, others will not. If the access network was designed to calculate optimal data rates for each of the access terminals, the system would not be easily scalable because the more access terminals there are in the system, the more resources it would take to calculate the rates for each of the access terminals. Also, more communication resources would be used for rate allocation control signaling.

One way in which the present system differs from typical systems is that the calculation of the data rates for the access terminals is the responsibility of each individual access terminal. In other words, it is distributed rather than centralized. The appropriate data rate for a particular access terminal is determined by that access terminal itself using a reverse link MAC algorithm. ("MAC" is an industry term for multi-access communications.) The reverse link MAC algorithm is the focus of this disclosure.

When a particular access terminal is calculating the data rate for its reverse link, it obviously would want to select the highest possible rate. There may, however, be other access terminals in the sector. These other access terminals would also try to transmit their data at the highest possible rate. Since the power required to transmit the data is roughly proportional to the data rate, increasing the data rates of each access terminal would also increase the power of their transmissions. Each access terminal's transmissions would then present an increasing amount of interference to the other access terminals. At some point, there would be so much interference that none of the access terminals would be able to transmit their data with an acceptable error rate.

It is therefore useful for the access terminals to have information on the level of interference present in the system. If the level of interference is relatively low, the access terminals can increase their data rates to some extent without causing a significant adverse impact on the overall performance of the system. If the level of interference is too high, however, increases in the access terminals' data rates will have a significant adverse impact.

The overall level of interference is therefore tracked in one embodiment by the access network. The access network is configured to simply determine whether the overall level of interference is above or below a threshold value. If the interference level is below the threshold, the access network sets a reverse activity bit (RAB) to 0. (The RAB is also sometimes referred to as a "busy bit.") If the interference level is above the threshold, the access network sets RAB=1. The RAB is then communicated to each of the access terminals to inform them of the level of activity/interference in the system.

In one embodiment, the overall interference level is computed by summing the power of each access terminal's reverse link transmissions and dividing by the level of thermal, or background, noise in the environment. The sum is then compared to a threshold. If the sum is greater than the threshold, then the interference level is considered to be high, and the RAB is set to 1. If the sum is less than the threshold, then the interference level is considered to be low, and the RAB is set to 0.

Because the performance of reverse link data communications is dependent upon the data rate and the level of interference in the system, it is necessary to take into account the level of interference in computing the appropriate data rate. The data rate calculation in the reverse link MAC algorithm therefore takes into account the interference level as provided to the access terminals in the form of the RAB. The reverse link MAC algorithm also takes into account factors such as the needs of the access terminal and the physical constraints of the system. Based upon these factors, the data rate for each access terminal is calculated once each frame.

The reverse link MAC algorithm is computed essentially as follows:

$$R_{new} = \min(R_1, R_2, R_3, R_4),$$

where $R_1$ is the system's maximum data rate;

$R_2$ is the maximum data rate of the access terminal, based upon power considerations;

$R_3$ is the data rate justified by the data in queue to be transmitted; and $R_4$ is the Closed-Loop Resource Allocation rate.

Each of rates $R_1$–$R_4$ sets a hard limit on $R_{new}$. In other words, rate $R_{new}$ selected by the reverse link MAC algorithm must not exceed any one of rates $R_1$–$R_4$.

The system's maximum data rate, $R_1$, is based upon the design of the system, including the access network and the access terminal. The system's maximum data rate is considered static ($R_1$ is settable by the access network, but is rarely changed, and can be considered static, and is therefore simply stored in the access terminal for use in calculating $R_{new}$.

As mentioned above, the power of a reverse link data transmission is roughly proportional to the rate at which the data is transmitted, so there is a maximum rate corresponding to the maximum power level and current channel conditions. The power-based maximum data rate, $R_2$, is based upon the maximum power of the access terminal's reverse link transmissions, which is a function of the design of the access terminal. While the actual maximum transmit power Pmax is static, $R_2$ varies as a function of $P_{max}$ and the current channel conditions. $R_2$ is related to the SINR (signal-to-noise-and-interference ratio) of the access terminal's signal as seen at the access network, which varies due to channel gain and current ROT (rise over thermal).

The rate $R_3$ is the data rate justified by the data which is in the access terminal's queue waiting to be transmitted. $R_3$ is variable and is computed at every frame. The purpose of $R_3$ is to reduce the reverse link data rates of access terminals when they have little or no data to transmit in order to reduce their interference with other access terminals. Conventionally, $R_3$ is simply the rate which is necessary to transmit all of the data in the queue in a single frame. Thus, if there were 2048 bits of data in the queue, a rate of 76.8 kbps would be selected. (Referring to the table above, at rate index 4, transmitting data at 76.8 kbps, 2048 bits can be transmitted in one slot.) If, on the other hand, there were 2049 bits of data in the queue, it would be necessary to select a rate of 153.6 kbps (4096 bits/slot) in order to transmit all of the data in a single slot. If there is no data in the queue, the justifiable rate is zero. Using this conventional method for computing $R_3$, the rate corresponding to $R_3$ may range from rate index 0 to rate index 5, regardless of the previous value of $R_3$. In one embodiment of the present invention, $R_3$ is controlled so that it does not drop too quickly. This will be explained in more detail below.

The closed-loop resource allocation (CLRA) rate, $R_4$, is also computed once every frame. The purpose of $R_4$ is to keep the data rate of each access terminal from increasing too rapidly and thereby creating more interference than the other access terminals can accommodate. The CLRA rate is based upon the current rate and a set of predetermined probabilities of the rate changing upward or downward. The probabilities used in the computation of the CLRA rate essentially control the rate to keep it from changing too rapidly.

Figure 4:
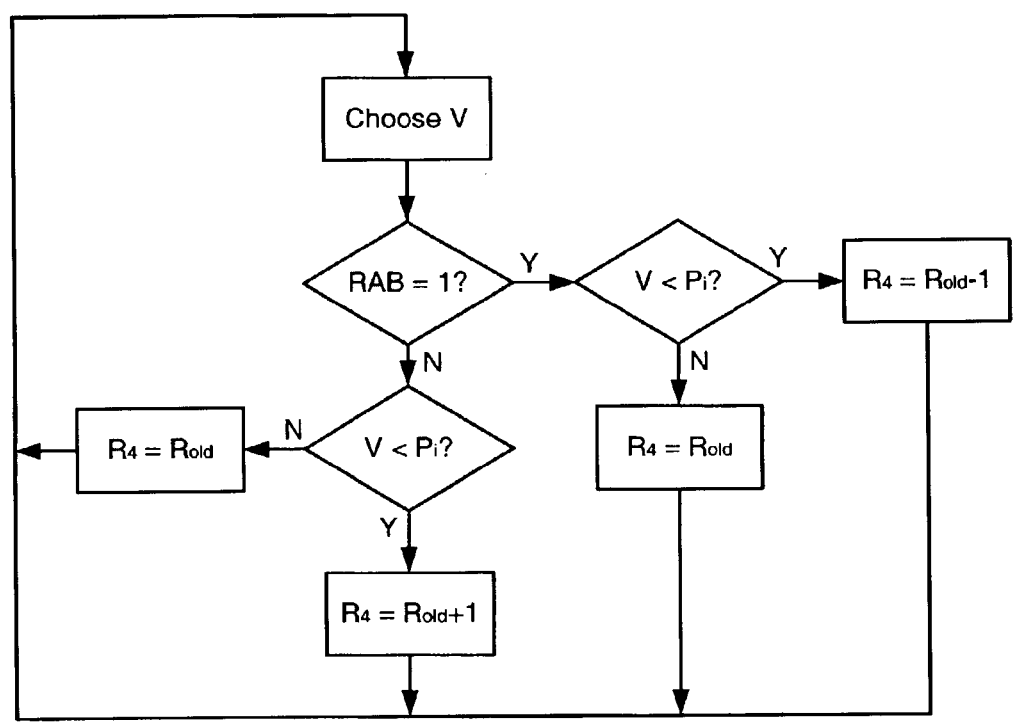
FIG. 4 is a flowchart illustrating the manner in which a closed-loop resource allocation rate is determined in one embodiment.

The CLRA rate, $R_4$, is calculated in the following manner. A corresponding flow diagram is shown in FIG. 4.

(1) Choose a random number V, where $0 \leq V \leq 1$,
(2) then,
  (i) if RAB=0,
    if $V < P_i$, $R_4 = R_{old} + 1$
    else $R_4 = R_{old}$
  (ii) if RAB=1,
    if $V < P_i$, $R_4 = R_{old} - 1$
    else $R_4 = R_{old}$ where
  $P_i$ is the probability corresponding to the current rate and RAB (see table below),
  $R_{old}$ is the current rate,
  $R_{old} + 1$ is the next higher rate from the current rate, and
  $R_{old} - 1$ is the next lower rate from the current rate.

The probabilities, $P_i$, corresponding to the various rate index and RAB values are shown in the following table. When the access terminal begins computation of the new data rate, it will be transmitting at a current rate. The access terminal will also receive a current RAB from the access network(s) that it is communicating with. The current rate determines from which row probability $P_i$ is taken. The current RAB determines from which column probability $P_i$ is taken.

In one embodiment, the probabilities are fixed and are pre-programmed into the access terminal. In other embodiments, the probability values may be computed by the access network and then downloaded to the access terminals.

TABLE 1

| rate index | Probability | |
|---|---|---|
| | RAB = 0 | RAB = 1 |
| 0 | 1 | 0 |
| 1 | $P_1$ | 0 |
| 2 | $P_2$ | $P_5$ |
| 3 | $P_3$ | $P_6$ |
| 4 | $P_4$ | $P_7$ |
| 5 | 0 | $P_8$ |

Each of the values listed in the table represents the probability that the access terminal, having the corresponding rate index and RAB values, will change to the next rate index. The values in the column under "RAB=0" are the probabilities that the access terminal will increase to the next higher rate index. The value corresponding to rate index 0 and RAB=0 is one because the access terminal is always allowed to move up from rate index 0 to rate index 1. The value corresponding to rate index 5 and RAB=0 is zero because the access terminal cannot move up from rate index 5. Probability values $P_1$–$P_4$ range from zero to one.

The values in the column under "RAB=1" are the probabilities that the access terminal will decrease to the next lower rate index. The value corresponding to rate index 0 and RAB=1 is zero because the access terminal cannot move down from rate index 0. The value corresponding to rate index 1 and RAB=1 is because the access terminal is never forced to move down from the lowest non-zero rate. Probability values $P_5$–$P_8$ range from zero to one.

The effect of calculating $R_4$ in this way is to allow $R_4$ to increase in a controlled manner when the system is not busy (RAB=0) and to force it to decrease, also in a controlled manner, when the system is busy (RAB=1). In other words, it causes $R_4$ to ramp up, rather than simply jumping up, and to ramp down rather than dropping precipitously. The ramping up/down is controlled by the probabilities of Table 1.

As noted above, $R_1$–$R_4$ are determined at each frame, and then the data rate for the next frame, $R_{new}$, is set to the minimum of these rates. The problem with this is that, while $R_4$ serves to limit the speed with which $R_{new}$ can increase over the current rate, $R_4$ does not prevent the rate $R_{new}$ from suddenly dropping. Even though $R_4$ can only decrease as quickly as allowed by the RAB=1 probabilities, $R_3$ can drop from rate index 5 to 0 on successive frames if the access terminal's data queue becomes empty, and since $R_{new}$ is the minimum of the calculated rates $R_1$–$R_4$, $R_3$ controls and $R_{new}$ can plummet.

While the sudden drop in the data transmission rate does not cause interference problems (it would reduce interference), it can cause delays in the transmission of data. This is a result of the fact that, after the data rate drops, which can happen suddenly, a certain amount of time is required for the data rate to ramp back up because of the limiting effect of $R_4$.

This can be illustrated in the following example. Consider a videoconferencing application generates an average of 60 kbps of data. The data comprises packets of 500–1000 bytes in size which arrive at the transmit queue in intervals of 70–80 milliseconds. If there is originally no data in the queue (and the transmit data rate is 0), it will take up to one frame (approximately 27 milliseconds in one embodiment) to move up from a rate index of 0 (0 kbps) to 1 (9.6 kbps). Depending upon the specific probabilities employed by the access terminal, it may take several more frames to move from rate index 1 to 2 (19.2 kbps), and so on. Until the transmit data rate surpasses the 60 kbps arrival rate, the data continues to accumulate in the queue.

Assuming that the probabilities used to compute $R_4$ allow the rate index to increase every two frames, it takes at least six frames (160 milliseconds) to transmit the first 500-byte packet. In the meantime, the data that has accumulated behind this packet continues to be delayed. Even though the data transmission rate will eventually catch up with the data arrival rate, there will be a significant delay in transmitting at least a portion of the data. In applications such as videoconferencing, these delays are unacceptable. It should also be noted that, in this example, the data transmission rate will eventually exceed the arrival rate, and the amount of data in the queue will begin to drop. If the queue length drops to zero, $R_3$ will also drop to zero, and the ramp-up process will have to start over, once more causing the delays in transmission.

In order to avoid the delays caused by sudden drops in the data rate and the subsequent need to ramp the data rate back up, one embodiment of the present system employs what can be referred to as "rate inertia". Rather than allowing the data rate to drop to a level that is justified by the instantaneous level of data in the transmit queue, the data rate is constrained to drop in a controlled manner. One of the reasons for this is for stability purposes. In a loaded sector, the rate at which the access terminal increases its transmit rate should be restricted, even if the access terminal was recently transmitting and is now idle. By forcing the access terminal to reduce its rate normally as governed by $R_4$ when RAB=1, the amount of unnecessary data sent when the extra interference is actually detrimental to other access terminals is restricted. There is a tradeoff between the current access terminal's delay performance and interference to other access terminals. By following $R_4$ when RAB=1 and setting $R_d$ (defined below) to the actually transmitted rate when it is lower, we ensure that the access terminal is sending dummy data for the most part when it doesn't matter, thus "filling in the gaps" in capacity, and improving delay without a large effect on measured throughput.

Figure 5:
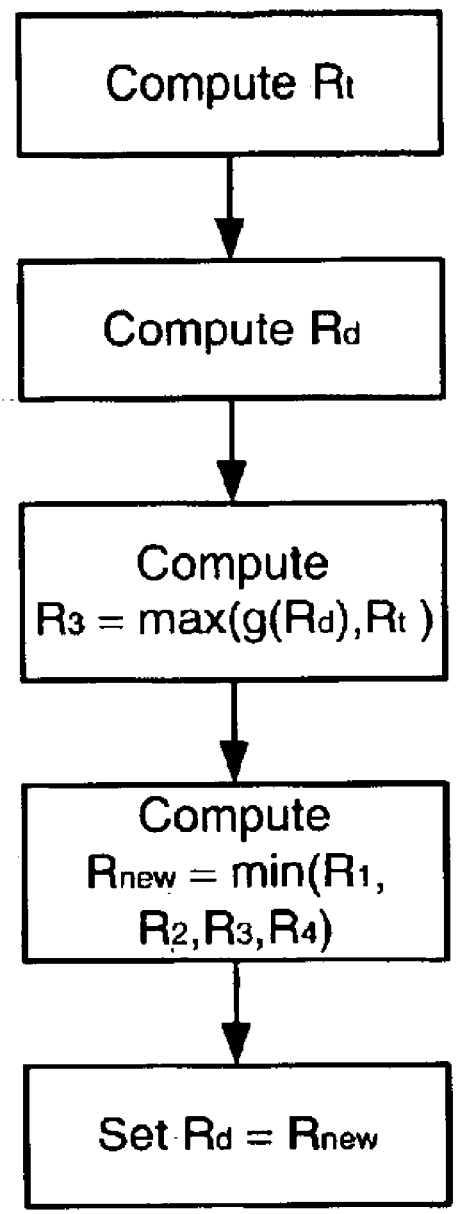
FIG. 5 is a flowchart illustrating the basic method in which a data-justified data rate is determined in one embodiment.

The control of the drop in $R_3$ can be accomplished in a number of ways. For example, in one embodiment, a dummy rate is maintained by the access terminal. The dummy rate is changed to model the desired behavior of drops in $R_3$. A decay factor is used in this embodiment to decrease the value of a dummy rate. Whenever the new data rate needs to be calculated, a tentative rate is calculated in the normal manner, then it is compared to the dummy rate. $R_3$ is set to the greater of the tentative rate (i.e., the data-justified value explained above) or the dummy rate. If the selected data rate is greater than the data-justified rate, then dummy data is transmitted. The method of this embodiment is set forth below and is illustrated in the flow diagram of FIG. 5.

(1) compute $R_t$ (as $R_3$ is conventionally computed above)
(2) compute $R_d = R_d + \log_2$(decay factor)
(3) set $R_3 = \max(g(R_d), R_t)$
(4) set $R_{new} = \min(R_1, R_2, R_3, R_4)$
(5) set $R_d = R_{new}$ where
$R_t$ is the tentative data-justified rate as conventionally computed
$R_d$ is the dummy rate (which either has a default value, or was previously computed)
$g(\ )$ maps $R_d$ to the lowest viable rate index greater than or equal to $R_d$ It should be noted that, if RAB=1, then the actual transmitted rate can go down faster than the inertia decay rate. This means the inertia rate is reduced in a heavily loaded sector, compared to a lightly loaded sector, which is usually desirable. In another embodiment, however, $R_d$ could be set to $R_3$ or some other value in step (5).

Figure 6:
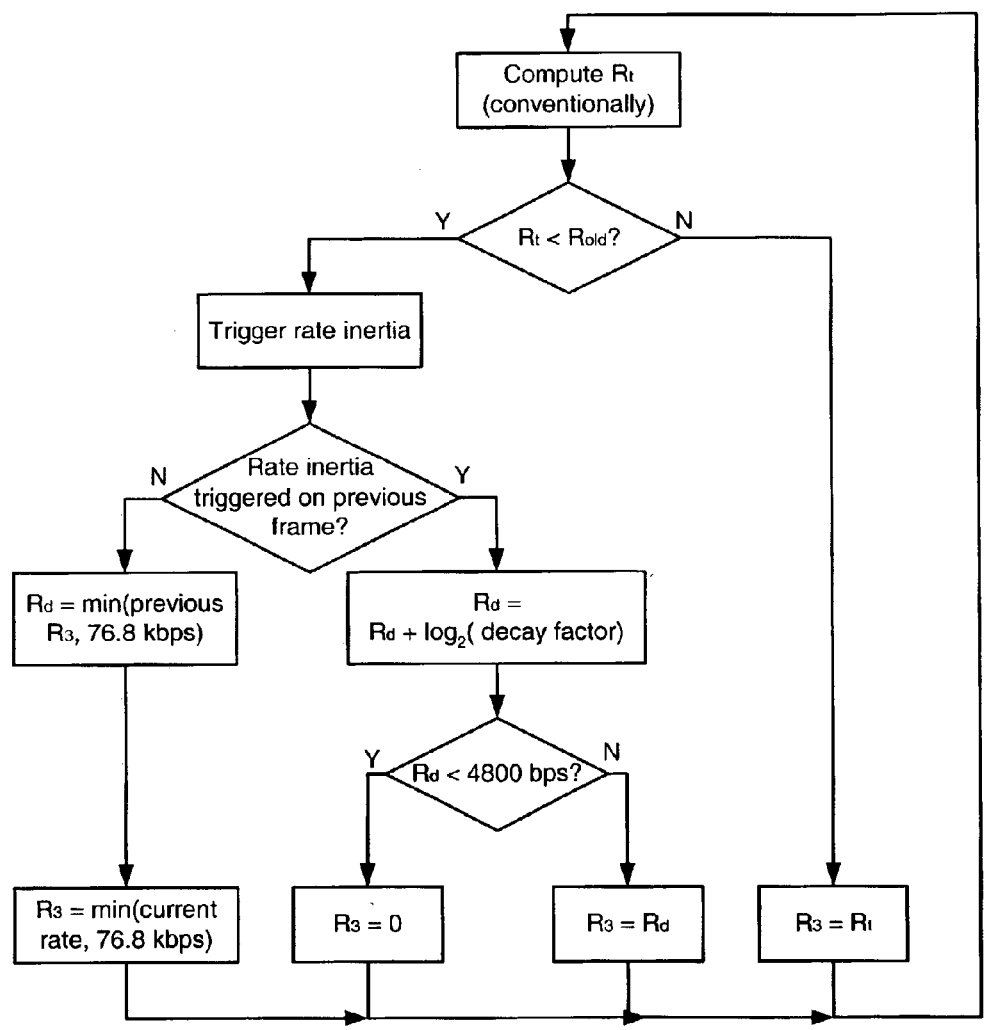
FIG. 6 is a flowchart illustrating a more detailed method by which a data-justified data rate is determined in one embodiment.

It should be noted that this method, which controls decreases in $R_3$, need not be used if the data-justified rate (conventionally computed) remains the same or increases. It should also be noted that, if the data-justified rate remains the same or increases, the method may include steps for resetting the dummy rate so that it does not prematurely decay (i.e., decay while the data-justified rate increases), thereby inadvertently allowing a sudden drop in $R_3$. One such embodiment is illustrated in the flowchart of FIG. 6.

In one embodiment, the decay factor is set to 0.5. In other words, the rate is only allowed to decrease by half each time it is calculated. This is equivalent to dropping by one rate index level in the current IS-856 standard release. An access terminal transmitting at a rate index of 5 would therefore take five frames to drop all the way down to the 0 rate index. Another embodiment might, for example, use a decay factor of 0.707 (the square root of 0.5), which would result in the dummy rate dropping one rate index level every two frames. The best value to use for the decay factor will vary with the data source statistics, and may be settable at the application layer.

The control of the drop in the data justified rate can be implemented in other ways as well. For example, rather than setting $R_3$ equal to the dummy rate, the dummy rate can be independently maintained, and the actual data rate (which is the minimum of $R_1$–$R_4$) can be set to the dummy rate.

In another example, $R_3$ may simply be constrained to drop no more than one rate index level per n frames. This would achieve essentially the same result as the algorithm above, where the conventionally computed data-justified rate drops suddenly. As noted above, a decay factor of 0.5 would be equivalent to dropping no more than one rate index level per frame, while a decay factor of 0.707 would be equivalent to dropping no more than one rate index level per two frames.

In another example, an algorithm similar to that used to limit $R_4$ can be used. In such an embodiment, a set of probability values corresponding to the different rate index values may be used to control the likelihood that $R_3$ will drop suddenly. The rate at which the data rate is allowed to decay can be controlled in other ways as well. The decay may, for example, be controlled by the multiplicative factor method explained above, it may be a function of source statistics, or it may be non-deterministic. Preference for each type depends on source statistics, and can be determined individually.

In yet another example, an algorithm similar to any of those described above can be applied to the overall data rate (i.e., the minimum of $R_1$–$R_4$). For instance, the actual data rate may be set equal to a dummy rate, so that the decrease in the actual rate from one frame to the next is limited by the decay factor.

The implementation of "rate inertia" as described above prevents the data-justified rate, $R_3$, from suddenly dropping to zero when the access terminal runs out of data in the transmit queue. The implementation of a "sticky rate," on the other hand, enables the ramp-up-limited rate, $R_4$, to quickly return to a higher rate if the system is not busy than would normally be allowed.

As noted above, the ramp-up-limited rate, $R_4$, is designed to control increases in the data rates of the access terminals in order to prevent them from suddenly creating an unmanageable amount of interference. This is only a concern, however, when there are enough access terminals active in the sector to generate an unmanageable amount of interference. If the activity of the access terminals within the sector is low enough, a rapid increase in the data rate of a given access terminal does not have a significant detrimental impact on the system. The dividing line between these two levels of activity is determined in one embodiment by the RAB. If RAB=0, then the level of activity is considered to be low enough that an access terminal will be allowed to move quickly back up to a higher rate (i.e., it is in a "not-busy" state). This higher rate is based on the highest rate used by the access terminal under certain conditions and is referred to herein as a "sticky rate". If RAB=1, however, the level of activity is considered to be too high to allow the data rate to increase (i.e., it is in a "busy" state), and the data rate will be constrained to ramp down in accordance with the algorithm described above in connection with $R_4$ (the data rate cannot ramp up when RAB=1).

The rate to which an access terminal is allowed to move quickly, under appropriate conditions, is the highest data rate that the access terminal has used since RAB was last set to 1 during a transmission by that access terminal. This rate (the "sticky rate") is tracked by the access terminal. If the access terminal is not transmitting data, the current value of the sticky rate is maintained, whether RAB is set to 0 or 1. If the access terminal is transmitting data, the sticky rate can be modified. More specifically, if RAB=1, the sticky rate is reset to the rate transmitted in the previous frame, $R_{old}$. If RAB=0, the sticky rate is maintained at its current value (if the access terminal's current data transmission rate is less than or equal to the sticky rate), or it is set to the current data rate (if the access terminal's current data transmission rate is greater than the sticky rate).

Figure 7:
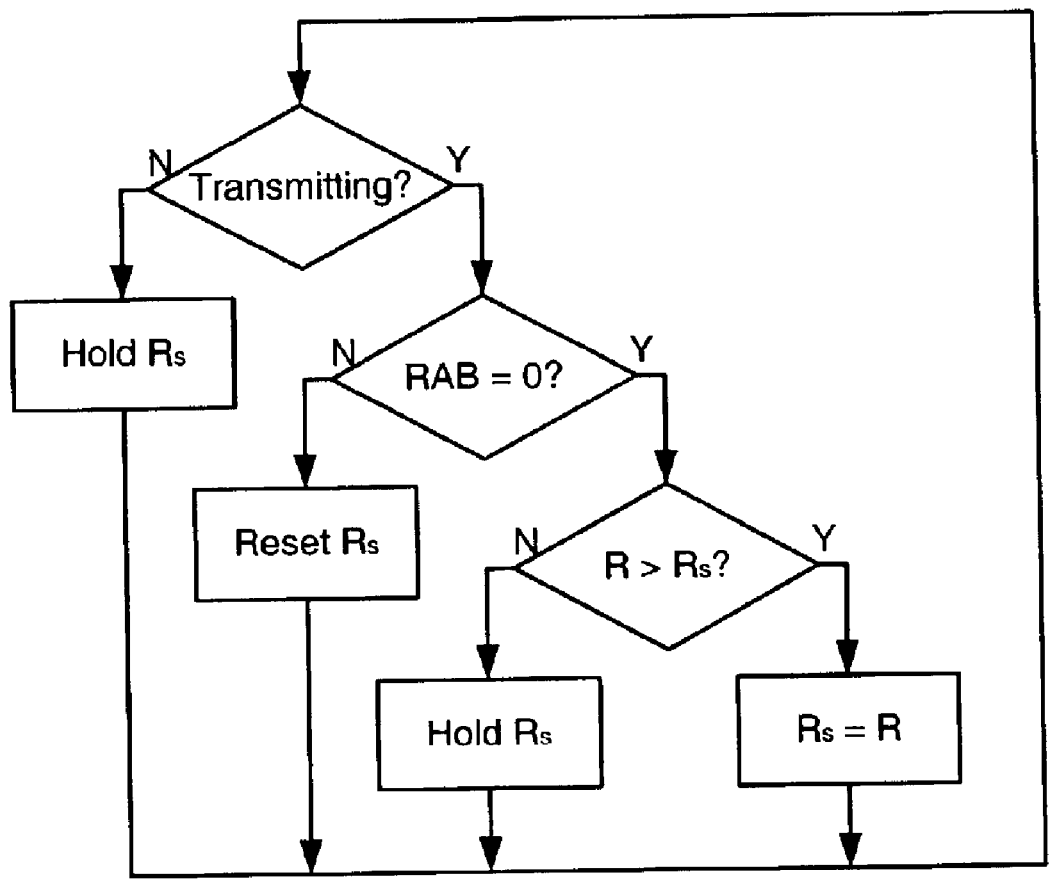
FIG. 7 is a flowchart illustrating a method for tracking a "sticky rate" in one embodiment.

In one embodiment, the algorithm for tracking the sticky rate is illustrated in the flow chart of FIG. 7. This flow chart can be summarized as follows.

Figure 8:
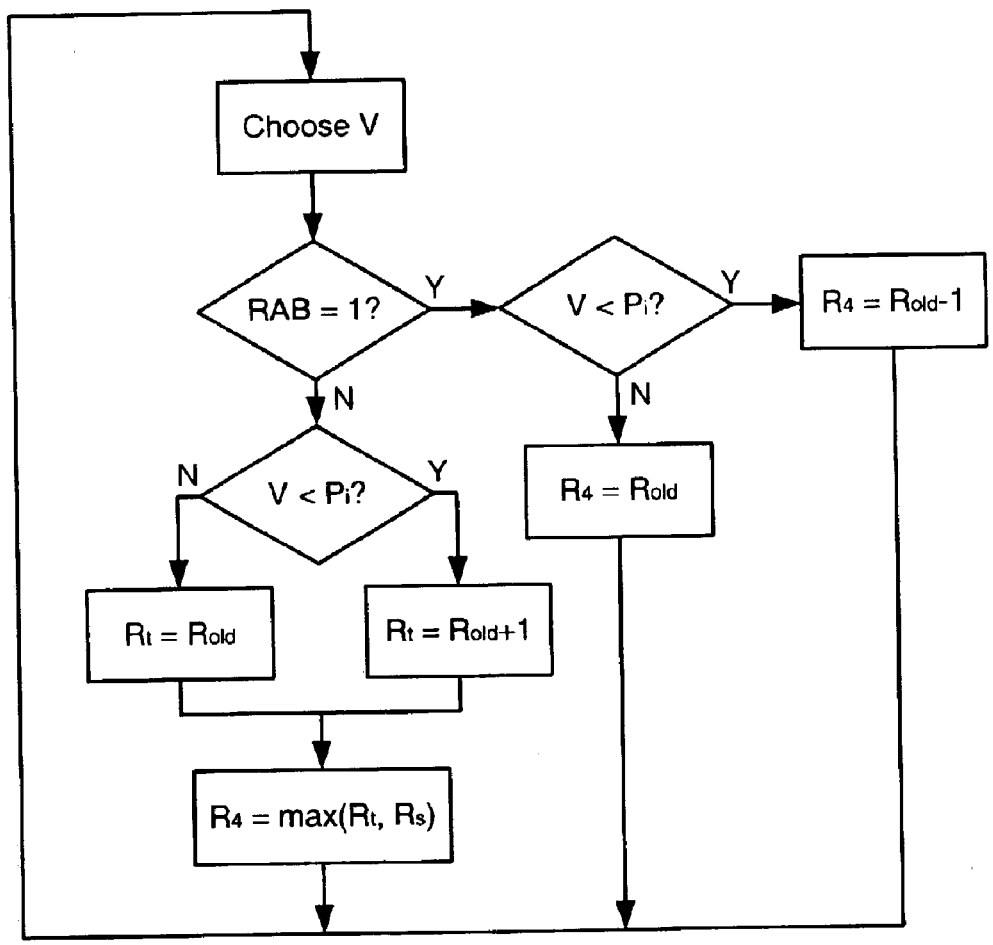
FIG. 8 is a flowchart illustrating the manner in which a closed-loop resource allocation rate is computed in one embodiment using a sticky rate.

(1) determine whether the access terminal is transmitting data
   (i) if the access terminal is not transmitting, hold $R_s$ at its current value
   (ii) if the access terminal is transmitting, determine whether RAB is set to 0
      (a) if RAB=1, set $R_s=R_{old}$
      (b) if RAB=0, determine whether the previous rate, $R_{old}$, is greater than $R_s$
         (A) if $R_{old}$ is greater than $R_s$, set $R_s$ equal to $R_{old}$
         (B) if $R_{old}$ is not greater than $R_s$, hold $R_s$ at its current value where $R_{old}$ is the previous data transmission rate $R_s$ is the sticky rate In one embodiment, the process of computing the sticky rate, $R_s$, is carried out in parallel with the computation of the ramp-up-limited rate, $R_4$. The algorithm for computing $R_4$, in this instance, is somewhat modified from the description above. In this embodiment, the computation of $R_4$ when RAB=0 computes the rate according to the above-described algorithm. The modified algorithm is illustrated in the flow chart of FIGURE 8, which is summarized below.

In order to determine the ramp-up-limited rate, $R_4$, using the sticky rate, the process for one embodiment is as follows.

(1) Choose a random number V, where $0 \leq V \leq 1$,
(2) then,
   (i) if RAB=0,
      (a) if $V<P_i$, $R_t=R_{old}+1$
          else $R_t=R_{old}$
      (b) $R_4=F(R_t, R_s, R_{old})$
   (ii) if RAB=1,
      if $V<P_i$, $R_4=R_{old}-1$
      else $R_4=R_{old}$ where $R_t$ is a tentative rate $P_i$ is the probability corresponding to the current rate and RAB (see table above), $R_{old}$ is the current rate, $R_{old}+1$ is the next higher rate from the current rate, and $R_{old}-1$ is the next lower rate from the current rate.

F( ) is a function that determines $R_4$ from $R_t$, $R_s$, and $R_{old}$. (Typical functions might be F(.)=max($R_t$, min($R_{old}+1$, $R_s$)) (i.e. increment 1 rate each time) or F(.)=max($R_t$, $R_s$)(jump to sticky-rate))

It should be noted that $R^t$, as used in the algorithms described herein, is a local variable. In other words, $R_t$ as computed in one algorithm is independent of $R_t$ as computed in another algorithm. These variables hold temporary values that may or may not be selected as the data rate for the next frame.

A variation of the embodiments that involve sticky rate is to measure the time elapsed since the last update (increase or reset) of sticky rate. If this time is greater than a specified value, then sticky rate will drop by a predetermined amount. The rationale for doing this is to avoid access terminals that have been idle for a long time to ramp up its data transmission rate too aggressively.

It should be noted that the implementation of a sticky rate is simply one of the possible ways to allow an access terminal to rapidly increase its data transmission rate when the system is not busy. Other embodiments may use alternative means to implement this functionality. For example, a sticky rate may be applied to the overall data rate rather than the ramp-up-limited rate. In other words, the sticky rate may be used to override the data-justified rate, $R_3$, as well as the ramp-up-limited rate, $R_4$. Other variations are also possible.

While the foregoing description is directed primarily to embodiments of the invention that comprise methods, it should be noted that other embodiments are possible. For example, one embodiment may comprise an access terminal configured to limit drops in a data-justified rate as described above. This embodiment may comprise a processor coupled to a transmit subsystem. The processor in one such embodiment is configured to compute a data rate for the reverse link on a frame-by-frame basis using threshold data, probability data, decay factor data and the like which is stored in a memory coupled thereto. The processor then provides control information, including the computed data rate, to the transmit subsystem, which transmits queued data to an access network. It should be noted that the components of the access terminal may vary from one embodiment to another.

Another embodiment may comprise an access terminal configured to enable rapid increases in a ramp-up-limited rate as described above. This embodiment may comprise a processor coupled to a transmit subsystem. The processor in one such embodiment is configured to compute a data rate for the reverse link on a frame-by-frame basis using threshold data, probability data, historical data rate information and the like which is stored in a memory coupled thereto. The processor then provides control information, including the computed data rate, to the transmit subsystem, which transmits queued data to an access network. Again, the components of the access terminal may vary from one such embodiment to another.

Still another embodiment may comprise a software application. The software application in this embodiment may be configured to receive information relating to the amount of queued data to be transmitted, the level of interference in the system (e.g., via the RAB), threshold data, probability data, decay factor data, and various other data, and to compute a limited-decrease data rate at which data will be transmitted from an access terminal. In another embodiment, the software application may be configured to receive information relating to whether or not a communication system is busy, probabilities that a data rate will increase or decrease, historical data rate information and the like, and to compute a rapid-increase data rate at which data will be transmitted from an access terminal to an access network. The software applications may be embodied in any of a variety of media readable by a computer or other data processor, such as a floppy disk, hard disk drive, CD-ROM, DVD-ROM, RAM, or ROM, to name a few.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for transmitting data on a reverse link from an access terminal to an access network, the method comprising:
   determining a first data transmission rate;
   transmitting data on the reverse link at the first data transmission rate;
   determining a second data transmission rate which is constrained to decrease by a limited amount from the first data transmission rate; and
   transmitting data on the reverse link at the second data transmission rate;
   wherein determining the second data transmission rate comprises determining a plurality of limiting rates and selecting a minimum of the limiting rates as the second data transmission rate;
   wherein the limiting rates comprise at least a data-justified rate corresponding to an amount of data in a transmit queue;
   wherein the data-justified rate is constrained to be no less than a dummy rate.

2. The method of claim 1, wherein the dummy rate decreases by a fraction per one or more transmission frames.

3. The method of claim 1, wherein the dummy rate decreases by a predetermined number of rate index levels per one or more transmission frames.

4. The method of claim 1, wherein the limiting rates comprise at least a closed-loop resource allocation rate.

5. The method of claim 1, wherein the limiting rates comprise at least a power-limited rate.

6. A method for transmitting data on a reverse link from an access terminal to an access network, the method comprising:
   determining a first data transmission rate;
   transmitting data on the reverse link at the first data transmission rate;
   determining a second data transmission rate which is constrained to decrease by a limited amount from the first data transmission rate; and
   transmitting data on the reverse link at the second data transmission rate;
   wherein determining the second data transmission rate comprises determining a plurality of limiting rates and selecting a minimum of the limiting rates as the second data transmission rate;
   wherein the limiting rates comprise at least a data-justified rate corresponding to an amount of data in a transmit queue;
   wherein the second data transmission rate is constrained to be no less than a predetermined amount less than the data-justified rate for the previous frame.

7. The method of claim 6, wherein the predetermined amount is a predetermined fraction of the data-justified rate per one or more transmission frames.

8. The method of claim 6, wherein the predetermined amount is a predetermined number of rate index levels per one or more transmission frames.

9. An apparatus comprising:
   a transmit subsystem;
   a processor coupled to the transmit subsystem and configured to control a data transmission rate of the transmit subsystem;
   wherein the processor is configured to determine a new data transmission rate which is constrained to decrease by a limited amount from a current data transmission rate,
   wherein the processor is configured to determine the new data transmission rate by determining a plurality of limiting rates and selecting a minimum of the limiting rates as the new data transmission rate; and
   a transmit queue, wherein the limiting rates comprise at least a data-justified rate corresponding to an amount of data in the transmit queue.

10. The apparatus of claim 9, wherein the processor is configured to constrain the data-justified rate to be no less than a dummy rate.

11. The apparatus of claim 10, wherein the dummy rate decreases by a fraction per one or more transmission frames.

12. The apparatus of claim 10, wherein the dummy rate decreases by a predetermined number of rate index levels per one or more transmission frames.

13. The apparatus of claim 9, wherein the limiting rates comprise at least a closed-loop resource allocation rate.

14. The apparatus of claim 9, wherein the limiting rates comprise at least a power-limited rate.

15. The apparatus of claim 9, wherein the processor is configured to constrain the new data transmission rate to be no less than a predetermined amount less than the current data transmission rate.

16. The apparatus of claim 15, wherein the predetermined amount is a predetermined fraction of the current data transmission rate per one or more transmission frames.

17. The apparatus of claim 15, wherein the predetermined amount is a predetermined number of rate index levels per one or more transmission frames.

18. A software product comprising a plurality of instructions embodied in a medium readable by a data processor, wherein the instructions are configured to cause the data processor to:
   determine a first data transmission rate;
   transmit data on a reverse link at the first data transmission rate;
   determine a second data transmission rate which is constrained to decrease by a limited amount from the first data transmission rate; and
   transmit data on the reverse link at the second data transmission rate;
   wherein determining the second data transmission rate comprises determining a plurality of limiting rates and selecting a minimum of the limiting rates as the second data transmission rate;

wherein the limiting rates comprise at least a data-justified rate corresponding to an amount of data in a transmit queue;

wherein the second data transmission rate is constrained to be no less than a predetermined amount less than the data-justified rate for the previous frame.

19. A method for transmitting data on a reverse link from an access terminal to an access network in a wireless communication system, the method comprising:

determining a first data transmission rate;

transmitting data on the reverse link at the first data transmission rate;

determining a second data transmission rate; and transmitting data on the reverse link at the second data transmission rate;

wherein when the wireless communication system is in a not-busy state, determining the second data transmission rate comprises selecting a rate from of a plurality of limiting rates, including a ramp-up-limited rate, wherein the ramp-up-limited rate is set equal to the greater of the first data transmission rate and a sticky rate.

20. The method of claim 19, further comprising determining the sticky rate based on previously transmitted data.

21. The method of claim 20, wherein the sticky rate comprises a maximum rate at which the access terminal last transmitted data during a busy state of the communication system.

22. The method of claim 19, wherein when the wireless communication system is in a busy state, determining the second data transmission rate comprises selecting a minimum rate of a plurality of limiting rates, including the ramp-up-limited rate.

23. The method of claim 22, wherein the ramp-up-limited rate is determined based upon a defined set of probabilities that the ramp-up-limited rate will increase or decrease.

24. The method of claim 19, further comprising resetting the sticky rate when the access terminal transmits data during a busy state of the wireless communication systems.

25. The method of claim 19, further comprising increasing the sticky rate when the access terminal transmits data in a not-busy state at a rate greater than the sticky rate.

26. An apparatus comprising:

a transmit subsystem; and a processor coupled to the transmit subsystem and configured to determine a new data transmission rate of the transmit subsystem by selecting the new rate from a plurality of limiting rates when the wireless communication system is in a not-busy state, wherein the limiting rates include a ramp-up-limited rate which is set equal to the greater of a current data transmission rate and a sticky rate.

27. The apparatus of claim 26, wherein the sticky rate comprises a rate determined from previously transmitted data.

28. The apparatus of claim 27, wherein the sticky rate comprises a maximum rate at which the access terminal last transmitted data during a busy state of the communication system.

29. The apparatus of claim 26, wherein the processor is further configured to reset the sticky rate when the access terminal transmits data during a busy state of the wireless communication system.

30. The apparatus of claim 26, wherein the processor is further configured to increase the sticky rate when the access terminal transmits data in a not-busy state at a rate greater than the sticky rate.

31. The apparatus of claim 26, wherein the processor is configured to select the new rate as a minimum of the plurality of limiting rates when the wireless communication system is in a busy state, wherein the limiting rates include a ramp-up-limited rate which is equal to a rate less than the current data transmission rate.

32. A software product comprising a plurality of instructions embodied in a medium readable by a data processor, wherein the instructions are configured to cause the data processor to:

determine a first data transmission rate;

transmit data on a reverse link at the first data transmission rate;

determine a second data transmission rate; and transmit data on the reverse link at the second data transmission rate;

wherein when the wireless communication system is in a not-busy state, determining the second data transmission rate comprises selecting a rate from a plurality of limiting rates, including a ramp-up-limited rate, wherein the ramp-up-limited rate is set equal to the greater of the first data transmission rate and a sticky rate, the sticky rate comprises a maximum rate at which the access terminal transmitted data since the access terminal last transmitted data during a busy state of the communication system.

* * * * *